(12) United States Patent
Uh et al.

(10) Patent No.: US 7,329,169 B2
(45) Date of Patent: Feb. 12, 2008

(54) APPARATUS AND METHOD FOR FABRICATING LIQUID CRYSTAL DISPLAY PANEL

(75) Inventors: Ji-Heum Uh, Seoul (KR); Sang-Son Shin, Kyoungsangbuk-Do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 284 days.

(21) Appl. No.: 10/988,557

(22) Filed: Nov. 16, 2004

(65) Prior Publication Data

US 2005/0090186 A1 Apr. 28, 2005

Related U.S. Application Data

(62) Division of application No. 10/260,664, filed on Oct. 1, 2002.

(30) Foreign Application Priority Data

Mar. 25, 2002 (KR) ......................... 2002-15970

(51) Int. Cl.
*B24B 1/00* (2006.01)

(52) U.S. Cl. ..................... 451/10; 349/187; 451/69; 451/11

(58) Field of Classification Search ............ 451/41, 451/28, 57, 69, 70, 5, 10, 11, 9; 349/187, 349/156, 117
See application file for complete search history.

(56) References Cited

U.S. PATENT DOCUMENTS

| | | | |
|---|---|---|---|
| 3,978,580 A | 9/1976 | Leupp et al. | |
| 4,653,864 A | 3/1987 | Baron et al. | |
| 4,775,225 A | 10/1988 | Tsuboyama et al. | |
| 5,247,377 A | 9/1993 | Omeis et al. | |
| 5,263,888 A | 11/1993 | Ishihara et al. | |
| 5,379,139 A | 1/1995 | Sato et al. | |
| 5,406,989 A | 4/1995 | Abe | |
| 5,499,128 A | 3/1996 | Hasegawa et al. | |
| 5,507,323 A | 4/1996 | Abe | |
| 5,511,591 A | 4/1996 | Abe | |

(Continued)

FOREIGN PATENT DOCUMENTS

| | | |
|---|---|---|
| EP | 1 003 066 A1 | 5/2000 |
| JP | 51-65656 | 6/1976 |
| JP | 57-038414 | 3/1982 |
| JP | 57-088428 | 6/1982 |
| JP | 58-027126 | 2/1983 |
| JP | 59-057221 | 4/1984 |
| JP | 59-195222 | 11/1984 |
| JP | 60-111221 | 6/1985 |
| JP | 60-164723 | 8/1985 |
| JP | 60-217343 | 10/1985 |

(Continued)

*Primary Examiner*—Eileen P. Morgan
(74) *Attorney, Agent, or Firm*—McKenna Long & Aldridge LLP

(57) ABSTRACT

An apparatus and method for fabricating a liquid crystal display panel are disclosed. In case of the single mode that liquid crystal display panels are fabricated with the same size on a large glass substrate, defective unit liquid crystal display panels are kept and discarded not to proceed with a follow-up process. Thus, a material waste is restrained and a yield can be improved. Meanwhile, in case of the multi-mode that liquid crystal display panels are fabricated with difference sizes on a large glass substrate, sub-models are kept, and then after completing the process for the main models, a follow-up process if performed on the sub-models. Thus use efficiency of the glass substrate can be maximized to improve a productivity and a unit cost of the product can be reduced.

13 Claims, 8 Drawing Sheets

U.S. PATENT DOCUMENTS

| | | | |
|---|---|---|---|
| 5,539,545 | A | 7/1996 | Shimizu et al. |
| 5,548,429 | A | 8/1996 | Tsujita |
| 5,642,214 | A | 6/1997 | Ishii et al. |
| 5,680,189 | A | 10/1997 | Shimizu et al. |
| 5,742,370 | A | 4/1998 | Kim et al. |
| 5,757,451 | A | 5/1998 | Miyazaki et al. |
| 5,852,484 | A | 12/1998 | Inoue et al. |
| 5,854,664 | A | 12/1998 | Inoue et al. |
| 5,861,932 | A | 1/1999 | Inata et al. |
| 5,952,676 | A | 9/1999 | Sato et al. |
| 5,952,678 | A | 9/1999 | Ashida |
| 5,956,112 | A | 9/1999 | Fujimori et al. |
| 6,001,203 | A | 12/1999 | Yamada et al. |
| 6,011,609 | A | 1/2000 | Kato et al. |
| 6,016,178 | A | 1/2000 | Kataoka et al. |
| 6,016,181 | A | 1/2000 | Shimada |
| 6,055,035 | A | 4/2000 | von Gutfeld et al. |
| 6,163,357 | A | 12/2000 | Nakamura |
| 6,219,126 | B1 | 4/2001 | Von Gutfeld |
| 6,222,603 | B1 | 4/2001 | Sakai et al. |
| 6,226,067 | B1 | 5/2001 | Nishiguchi et al. |
| 6,236,445 | B1 | 5/2001 | Foschaar et al. |
| 6,297,869 | B1 * | 10/2001 | Choo et al. .................. 349/187 |
| 6,304,306 | B1 | 10/2001 | Shiomi et al. |
| 6,337,730 | B1 | 1/2002 | Ozaki et al. |
| 6,414,733 | B1 | 7/2002 | Ishikawa et al. |
| 6,565,421 | B1 * | 5/2003 | Choo ........................... 451/41 |
| 6,580,489 | B2 * | 6/2003 | Choo et al. .................. 349/187 |
| 6,587,160 | B2 * | 7/2003 | Lee et al. ...................... 349/40 |
| 6,774,958 | B2 * | 8/2004 | Kweon et al. ................. 349/40 |
| 6,775,724 | B2 * | 8/2004 | Toshitani et al. ............. 710/60 |
| 6,778,249 | B1 | 8/2004 | Kamosawa et al. |
| 6,850,088 | B2 * | 2/2005 | Uh et al. .................... 324/770 |
| 6,870,594 | B1 | 3/2005 | Zhang |

FOREIGN PATENT DOCUMENTS

| | | |
|---|---|---|
| JP | 61-007822 | 1/1986 |
| JP | 61-055625 | 3/1986 |
| JP | S62-054225 | 3/1987 |
| JP | S62-054228 | 3/1987 |
| JP | 62-089025 | 4/1987 |
| JP | 62-090622 | 4/1987 |
| JP | 62-205319 | 9/1987 |
| JP | 63-109413 | 5/1988 |
| JP | 63-110425 | 5/1988 |
| JP | 63-128315 | 5/1988 |
| JP | 63-311233 | 12/1988 |
| JP | H03-009549 | 1/1991 |
| JP | H05-036425 | 2/1993 |
| JP | H05-036426 | 2/1993 |
| JP | H05-107533 | 4/1993 |
| JP | 05-127179 | 5/1993 |
| JP | 05-154923 | 6/1993 |
| JP | 05-265011 | 10/1993 |
| JP | 05-281557 | 10/1993 |
| JP | 05-281562 | 10/1993 |
| JP | H06-018829 | 1/1994 |
| JP | 06-051256 | 2/1994 |
| JP | H06-064229 | 3/1994 |
| JP | 06-148657 | 5/1994 |
| JP | 06-160871 | 6/1994 |
| JP | H06-194637 | 7/1994 |
| JP | 6194673 | 7/1994 |
| JP | 06-235925 | 8/1994 |
| JP | 06-265915 | 9/1994 |
| JP | 06-313870 | 11/1994 |
| JP | 07-084268 | 3/1995 |
| JP | 07-128674 | 5/1995 |
| JP | 07-181507 | 7/1995 |
| JP | H07-275770 | 10/1995 |
| JP | H07-275771 | 10/1995 |
| JP | H08-076133 | 3/1996 |
| JP | 08-095066 | 4/1996 |
| JP | 08-101395 | 4/1996 |
| JP | 08-106101 | 4/1996 |
| JP | H08-110504 | 4/1996 |
| JP | H08-136937 | 5/1996 |
| JP | 08-171094 | 7/1996 |
| JP | H08-173874 | 7/1996 |
| JP | 08-190099 | 7/1996 |
| JP | 08-240807 | 9/1996 |
| JP | H09-001026 | 1/1997 |
| JP | 09-005762 | 1/1997 |
| JP | 09-026578 | 1/1997 |
| JP | 09-311340 | 2/1997 |
| JP | 09-61829 | 3/1997 |
| JP | 09-073075 | 3/1997 |
| JP | 09-073096 | 3/1997 |
| JP | H09-094500 | 4/1997 |
| JP | 09-127528 | 5/1997 |
| JP | 09-230357 | 9/1997 |
| JP | 09-258254 | 10/1997 |
| JP | 09-281511 | 10/1997 |
| JP | 10096882 | 4/1998 |
| JP | 10-123537 | 5/1998 |
| JP | 10-123538 | 5/1998 |
| JP | 10-142616 | 5/1998 |
| JP | H10-174924 | 6/1998 |
| JP | 10-177178 | 6/1998 |
| JP | 10-221700 | 8/1998 |
| JP | 10-282512 | 10/1998 |
| JP | 10-333157 | 12/1998 |
| JP | 10-333159 | 12/1998 |
| JP | 11-014953 | 1/1999 |
| JP | 11-038424 | 2/1999 |
| JP | 11-064811 | 3/1999 |
| JP | 11-109388 | 4/1999 |
| JP | 11-133438 | 5/1999 |
| JP | 11-142825 | 5/1999 |
| JP | 11-142864 | 5/1999 |
| JP | 11-174477 | 7/1999 |
| JP | 11-212045 | 8/1999 |
| JP | 11-248930 | 9/1999 |
| JP | H11-262712 | 9/1999 |
| JP | H11-264991 | 9/1999 |
| JP | 11-326922 | 11/1999 |
| JP | 11343132 | 12/1999 |
| JP | 11-344714 | 12/1999 |
| JP | 2000-002879 | 1/2000 |
| JP | 2000-029035 | 1/2000 |
| JP | 2000-056311 | 2/2000 |
| JP | 2000-066162 | 3/2000 |
| JP | 2000-066165 | 3/2000 |
| JP | 2000-066218 | 3/2000 |
| JP | 2000-093866 | 4/2000 |
| JP | 2000-137235 | 5/2000 |
| JP | 2000-147528 | 5/2000 |
| JP | 2000-180808 | 6/2000 |
| JP | 2000-193988 | 7/2000 |
| JP | 2000-195775 | 7/2000 |
| JP | 2000-206503 | 7/2000 |
| JP | 200-267135 | 9/2000 |
| JP | 2000-241824 | 9/2000 |
| JP | 2000-284295 | 10/2000 |
| JP | 2000-292759 | 10/2000 |
| JP | 2000-292799 | 10/2000 |
| JP | 2000-310759 | 11/2000 |
| JP | 2000-310784 * | 11/2000 |
| JP | 2000-338501 * | 12/2000 |
| JP | 2001-005401 * | 1/2001 |

| | | | | | | | |
|---|---|---|---|---|---|---|---|
| JP | 2001-005405 | * | 1/2001 | JP | 2002-082340 | | 3/2002 |
| JP | 2001-013506 | * | 1/2001 | JP | 2002-090759 | | 3/2002 |
| JP | 2001-033793 | * | 2/2001 | JP | 2002-090760 | | 3/2002 |
| JP | 2001-042341 | * | 2/2001 | JP | 2002-107740 | | 4/2002 |
| JP | 2001-051284 | * | 2/2001 | JP | 2002-122870 | | 4/2002 |
| JP | 2001-066615 | * | 3/2001 | JP | 2002-122872 | | 4/2002 |
| JP | 2001-091727 | * | 4/2001 | JP | 2002-122873 | | 4/2002 |
| JP | 2001-117105 | * | 4/2001 | JP | 2002-131762 | | 5/2002 |
| JP | 2001-117109 | * | 4/2001 | JP | 2002-139734 | | 5/2002 |
| JP | 2001-133745 | * | 5/2001 | JP | 2002-156518 | | 5/2002 |
| JP | 2001-133794 | * | 5/2001 | JP | 2002-169166 | | 6/2002 |
| JP | 2001-133799 | * | 5/2001 | JP | 2002-169167 | | 6/2002 |
| JP | 2001-142074 | * | 5/2001 | JP | 2002-182222 | | 6/2002 |
| JP | 2001-147437 | * | 5/2001 | JP | 2002-202512 | | 7/2002 |
| JP | 2001-209058 | | 5/2001 | JP | 2002-202514 | | 7/2002 |
| JP | 2001-154211 | * | 6/2001 | JP | 2002-214626 | | 7/2002 |
| JP | 2001-166272 | * | 6/2001 | JP | 2002-229042 | | 8/2002 |
| JP | 2001-166310 | * | 6/2001 | JP | 2002-236276 | | 8/2002 |
| JP | 2001-183683 | * | 7/2001 | JP | 2002-258299 | | 8/2002 |
| JP | 2001-201750 | | 7/2001 | JP | 2002-236292 | | 9/2002 |
| JP | 2001-209052 | | 8/2001 | JP | 2002-277865 | | 9/2002 |
| JP | 2001-209056 | | 8/2001 | JP | 2002-277866 | | 9/2002 |
| JP | 2001-209057 | | 8/2001 | JP | 2002-277881 | | 9/2002 |
| JP | 2001-209060 | | 8/2001 | JP | 2002-287156 | | 10/2002 |
| JP | 2001-215459 | | 8/2001 | JP | 2002-296605 | | 10/2002 |
| JP | 2001-222017 | | 8/2001 | JP | 2002-311438 | | 10/2002 |
| JP | 2001-235758 | | 8/2001 | JP | 2002-311440 | | 10/2002 |
| JP | 2001-255542 | | 9/2001 | JP | 2002-311442 | | 10/2002 |
| JP | 2001-264782 | | 9/2001 | JP | 2002-314359 | | 11/2002 |
| JP | 2001-272640 | | 10/2001 | JP | 2002-323687 | | 11/2002 |
| JP | 2001-281675 | | 10/2001 | JP | 2002-323694 | | 11/2002 |
| JP | 2001-281678 | | 10/2001 | JP | 2002-333628 | | 11/2002 |
| JP | 2001-282126 | | 10/2001 | JP | 2002-333635 | | 11/2002 |
| JP | 2001-305563 | | 10/2001 | JP | 2002-333843 | | 11/2002 |
| JP | 2001-330837 | | 11/2001 | JP | 2002-341329 | | 11/2002 |
| JP | 2001-330840 | | 11/2001 | JP | 2002-341355 | | 11/2002 |
| JP | 2001-356353 | | 12/2001 | JP | 2002-341356 | | 11/2002 |
| JP | 2001-356354 | | 12/2001 | JP | 2002-341357 | | 11/2002 |
| JP | 2002-014360 | | 1/2002 | JP | 2002-341358 | | 11/2002 |
| JP | 2002-023176 | | 1/2002 | JP | 2002-341362 | | 11/2002 |
| JP | 2002-049045 | | 2/2002 | KR | 2000-0035302 | | 6/2000 |
| JP | 2002-079160 | | 3/2002 | | | | |
| JP | 2002-080321 | | 3/2002 | * cited by examiner | | | |

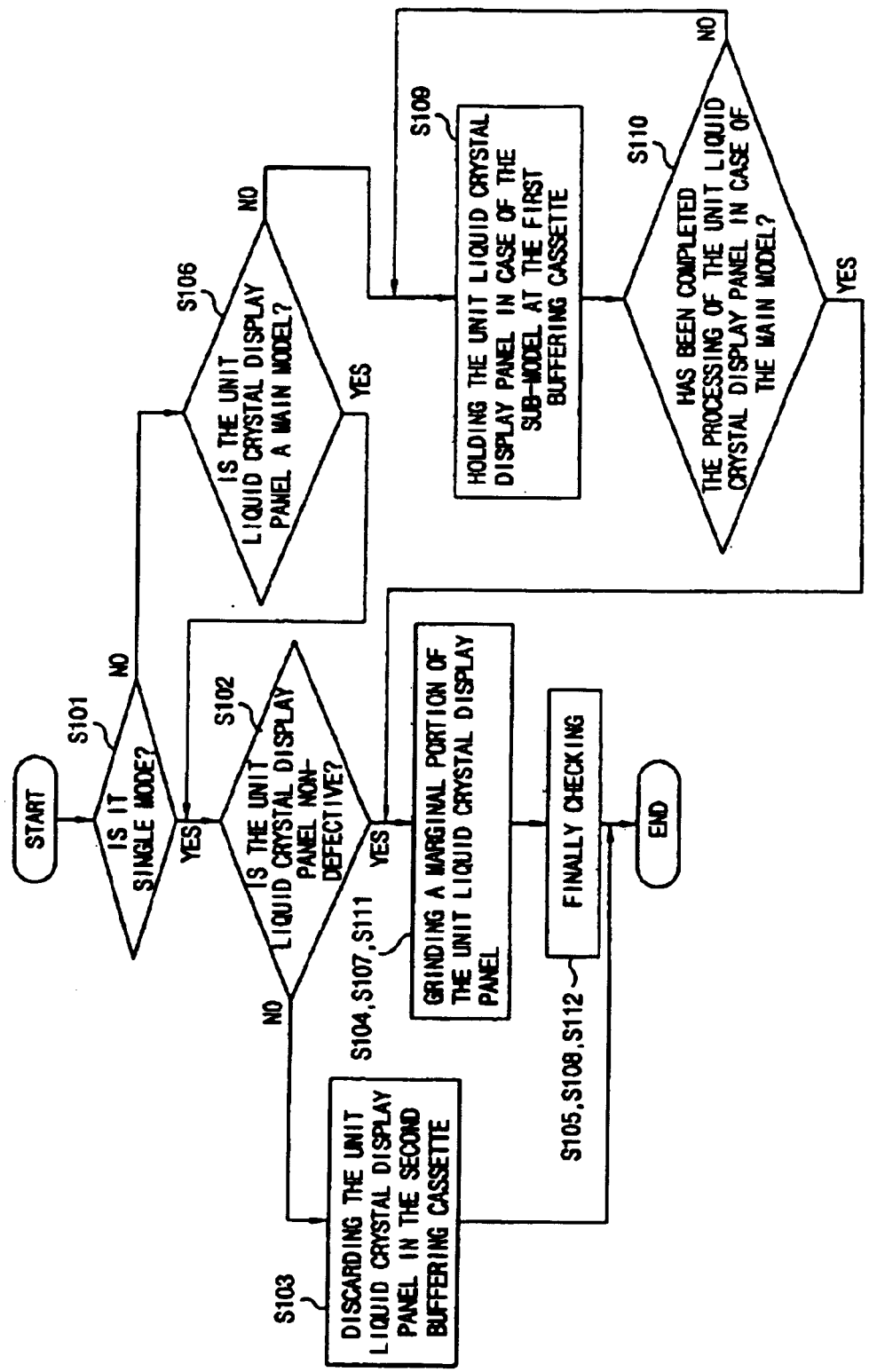

APPARATUS AND METHOD FOR FABRICATING LIQUID CRYSTAL DISPLAY PANEL

This application is a divisional of prior application Ser. No. 10/260,664, filed Oct. 1, 2002.

This application claims the benefit of Korean Patent Application No. 2002-15970, filed on Mar. 25, 2002, which is hereby incorporated by reference for all purposes as if fully set forth herein.

BACKGROUND OF THE INVENTION

1. Field of the Invention

The present invention relates to an apparatus and method for fabricating a liquid crystal display panel, and more particularly, to an apparatus and method for fabricating a liquid crystal display panel in which a defective unit liquid crystal display panel is discarded so that follow-up processes are not performed on the defective unit liquid crystal display panel when a single mode that liquid crystal display panels are fabricated with the same size on a large glass substrate, and in case of a multi-mode that liquid crystal display panels are fabricated with different sizes, sub-models are kept to proceed with a follow-up process.

2. Discussion of the Related Art

In general, a liquid crystal display device displays a desired image by individually supplying a data signal according to image information to liquid crystal cells arranged in a matrix form and controlling a light transmittance of the liquid crystal cells.

An improvement of yield in manufacturing liquid crystal display devices may be obtained by forming a plurality of thin film transistor array substrates on a large mother substrate and a plurality of color filter substrates on a separate mother substrate. The mother substrates are then attached. A plurality of unit liquid crystal display panels are formed from the attached thin film transistor array substrates and the color filter substrates and separated by cutting.

Usually, cutting of the unit liquid crystal display panels is performed such that a predetermined cutting line is formed on the surface of the mother substrate by using a wheel with a stronger hardness compared to a glass and propagating a crack along the cutting predetermined line.

The liquid crystal display panel will now be described with reference to the accompanying drawings.

FIG. 1 is an exemplary view illustrating a section of a plurality of unit liquid crystal display panels formed by attaching a first mother substrate with a plurality of thin film transistor array substrates formed thereon and a second mother substrate with color filter substrates formed thereon.

With reference to FIG. 1, in the unit liquid crystal display panels, the thin film transistor array substrates 1 protrude to one side compared to the color filter substrates 2, because a gate pad unit (not shown) and a data pad unit (not shown) are formed at the marginal portion of the thin film transistor array substrate 1 that does not overlap with the color filter substrate 2.

Accordingly, the color filter substrates 2 formed on the second mother substrate 30 are formed isolated by a dummy region 31 corresponding to the protruded portion of the thin film transistor array substrates 1 formed on the first mother substrate 20.

The unit liquid crystal display panels are suitably disposed such that the area of the first and the second mother substrates 20 and 30 can be utilized at the maximum, and though they differ depending on a model, the unit liquid crystal display panels are usually formed isolated by a dummy region 32.

After the first mother substrate 20 with the thin film transistor array substrates 1 and the second mother substrate 30 with the color filter substrates 2 are attached to each other, the liquid crystal display panels are individually cut. At this time, the dummy region 31 formed at the portion where the color filter substrates 2 of the second mother substrate are isolated and the dummy region 32 isolating the unit liquid crystal display panels are simultaneously removed.

FIG. 2 is an exemplary view showing a plane structure of the unit liquid crystal display panel.

With reference to FIG. 2, the unit liquid crystal display panel 10 includes an image display unit 13 in which liquid crystal cells are arranged in a matrix form, a gate pad part 14 for connecting gate lines (GL1 to GLm) of the image display unit 13 to a gate driver integrated circuit (not shown) to which a gate signal is applied, and a data pad part 15 for connecting data lines (DL1 to DLn) of the image display unit 13 to a data driver integrated circuit (not shown) to which image information is applied.

The gate pad part 14 and the data pad part 15 are formed at marginal portions of the thin film transistor array substrate 1, which protrude from the short side and the long side of the thin film transistor array substrate 1 as compared to the color filter substrate 2.

Though not shown in detail on the drawing a thin film transistor for switching the liquid crystal cells is formed at each of intersectional portions of the data lines DL1 to DLn and the gate lines GL1 to GLm. The data and gate lines define pixel or cell regions that include a pixel electrode connected to the thin film transistor for applying an electric field to the liquid crystal cells. A passivation film for protecting the data lines DL1 to DLn and the gate lines GL1 to GLm, thin film transistors and electrodes is over the thin film transistor array substrate 1.

The color filter substrate 2 includes color filters which are separated from adjacent cell regions by a black matrix. The color filter substrate also includes a common electrode, which is a counter electrode of the pixel electrode formed on the thin film transistor array substrate 1.

A cell gap is prepared between the thin film transistor array substrate 1 and the color filter substrate 2 that they are isolated with a certain space therebetween. The thin film transistor array substrate 1 and the color filter substrate 2 are attached by a sealant (not shown) formed at an exterior of the image display unit 13, and a liquid crystal layer (not shown) is formed in the space between the thin film transistor array substrate 1 and the color filter substrate 2.

FIG. 3 is a flow chart of a process for fabricating the unit liquid crystal display panel.

As shown in FIG. 3, the process for fabricating the unit liquid crystal display panel includes fabricating the thin film transistor array substrates on the first mother substrate and the color filter substrates on the second mother substrate (P1); attaching the first mother substrate and the second substrate with a certain space maintained therebetween (P2); cutting the first mother substrate and the second mother substrate as attached and extracting unit liquid crystal display panels (P3); and checking the unit liquid crystal display panels (P4).

As illustrated in the flow chart of FIG. 4 the step (P3) for cutting the first and second mother substrates and extracting unit liquid crystal display panels includes: loading the first and second mother substrates (S1); cutting the loaded first and second mother substrates into unit liquid crystal display panels (S2); checking a cut section of the unit liquid crystal display panel (S3); grinding a marginal portion of the unit liquid crystal display panel and cleaning it (S4); and unloading the unit liquid crystal display panel (S5).

As shown in FIG. 5, thin film transistor array substrates 111 are formed on the first mother substrate 110, and color filter substrates 121 are formed on the second mother substrate 120.

The thin film transistor array substrates 111 or the color filter substrates 121 may be randomly defective due to an unexpected flaw during any of the fabrication processes. The defective cases are shown by 'NG (No Good)' in the drawing, while 'G (Good)' indicates that there is no defect.

After the first mother substrate 110 and the second mother substrate 120 are attached, they are cut into the unit liquid crystal display panels.

Then, 'G'-indicated thin film transistor array substrate 111 and 'G'-indicated color filter substrate 121 may be attached and cut into a unit liquid crystal display panel, 'NG'-indicated thin film transistor array substrate 111 and 'G'-indicated color filter substrate 121 may be attached and cut into a unit liquid crystal display panel, or 'G'-indicated thin film transistor array substrate 111 and 'NG'-indicated color filter substrate 121 may be attached and cut into a unit liquid crystal display panel.

Among them, the unit liquid crystal display panel made from the attachment of the 'NG'-indicated thin film transistor array substrate 111 and 'G'-indicated color filter substrate 121 or the unit liquid crystal display panel made from the attachment of the G'-indicated thin film transistor array substrate 111 and 'NG'-indicated color filter substrate 121 should be discarded because it contains a defect and, therefore, it should not be used in a product.

Recent efforts to increase the number of liquid crystal display panels fabricated on the mother substrates by enlarging the mother substrate cause more unit liquid crystal display panels to be defective and thus discarded. The result is that the unit liquid crystal display panels to be discarded may be subjected to a grinding, cleaning and final checking just like the good (not defective) unit liquid crystal display panels to be used in products.

That is, in the related art, the unit liquid crystal display panels to be discarded and the unit liquid crystal display panels to be products undergo the grinding and cleaning and are classified into unit liquid crystal display panels to be discarded and unit liquid crystal display panels to be products only through the final checking. Therefore, since even the unit liquid crystal display panels to be discarded are subjected to the grinding, cleaning and final checking, problems arise in that materials are wasted and a yield is degraded.

FIG. 6 is an exemplary view showing a plurality of liquid crystal display panels formed on a large scale mother substrate.

As shown in FIG. 6, six liquid crystal display panels 210 are formed isolated at regular intervals in consideration of the sizes of the mother substrate 200 and the liquid crystal display panels 210.

Meanwhile, as shown in FIG. 7, if large sized liquid crystal display panels 220 are desired to be fabricated from a mother substrate 20 is fixed in size, only three liquid crystal display panels 220 can be formed on the mother substrate 200, and the portions of the mother substrate 200 in regions where the liquid crystal display panels 220 are not formed should be discarded.

Thus, the use efficiency of the mother substrate 200 is deteriorated, resulting in a degradation of a productivity and increase in a unit cost of a product.

SUMMARY OF THE INVENTION

Therefore, an advantage of the present invention is to provide an apparatus and method for fabricating a liquid crystal display panel in which in case of a single mode that liquid crystal display panels are fabricated with the same size on a large glass substrate, a defective unit liquid crystal display panel is discarded so as not to proceed with follow-up processes, and in case of a multi-mode that liquid crystal display panels are fabricated with different sizes, submodels are kept to proceed with a follow-up process.

To achieve these and other advantages and in accordance with the purpose of the present invention, as embodied and broadly described herein, there is provided a fabricating apparatus of a liquid crystal display panel including an attaching unit attaching a first mother substrate and a second mother substrate; a cutting unit cutting the first and second mother substrates into unit liquid crystal display panels; a checking unit checking for defects in the unit liquid crystal display panels; a buffering cassette holding a defective unit liquid crystal display panel; a grinding unit grinding a marginal portion of the unit liquid crystal display panel; and a final checking unit checking the unit liquid crystal display panels.

To achieve the above object, there is also provided a method for fabricating of a liquid crystal display panel including determining whether a liquid crystal display panel is a single mode or a multi-mode; determining whether a cut unit liquid crystal display panel is non-defective or defective in the single mode; sorting out and discarding any defective unit liquid crystal display panel; grinding a marginal portion of any non-defective unit liquid crystal display panel; finally checking the non-defective unit liquid crystal display panel; determining whether the cut unit liquid crystal display panel is a main model or a sub-model of the multi-mode; grinding a marginal portion of the unit liquid-crystal display panel of the main model; finally checking the unit liquid crystal display panel of the main model; holding the unit liquid crystal display panel of the sub-model in a buffering cassette; determining whether the processing of the main model has been completed; grinding a marginal portion of the unit liquid crystal display panel of the sub-model if the processing of the main model has been completed; and finally checking the unit liquid crystal display panel of the sub-model.

To achieve the above object, there is also provided a method for fabricating of a liquid crystal display panel including determining whether a liquid crystal display panel is a single mode or a multi-mode; determining whether a cut unit liquid crystal display panel is non-defective or defective in the single mode; sorting out and discarding any defective unit liquid crystal display panel; grinding a marginal portion of any non-defective unit liquid crystal display panel; finally checking the non-defective unit liquid crystal display panel; determining whether the cut unit liquid crystal display panel is a main model or a sub-model of the multi-mode; determining whether a cut unit liquid crystal display panel of the main model is non-defective or defective; sorting out and discarding any defective unit liquid crystal display panel of the main model; grinding a marginal portion of the non-defective unit liquid crystal display panel of the main model; finally checking the non-defective unit liquid crystal display panel of the main model; holding the unit liquid crystal display panel of the sub-model in a buffering cassette; determining whether the processing of the main model has been completed; determining whether a cut unit liquid crystal display panel of the sub model is non-defective or defective if the processing of the main model has been completed; sorting out and discarding any defective unit liquid crystal display panels of the sub model; grinding a marginal portion of the non-defective unit liquid crystal display panel of the sub-model; and finally checking the unit liquid crystal display panel of the sub-model.

The foregoing and other features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 11 is a flow chart of a method for fabricating a liquid crystal display panel in accordance with an embodiment of the present invention.

DETAILED DESCRIPTION OF THE ILLUSTRATED EMBODIMENTS

Reference will now be made in detail to the embodiments of the present invention, examples of which are illustrated in the accompanying drawings.

Figure 8:
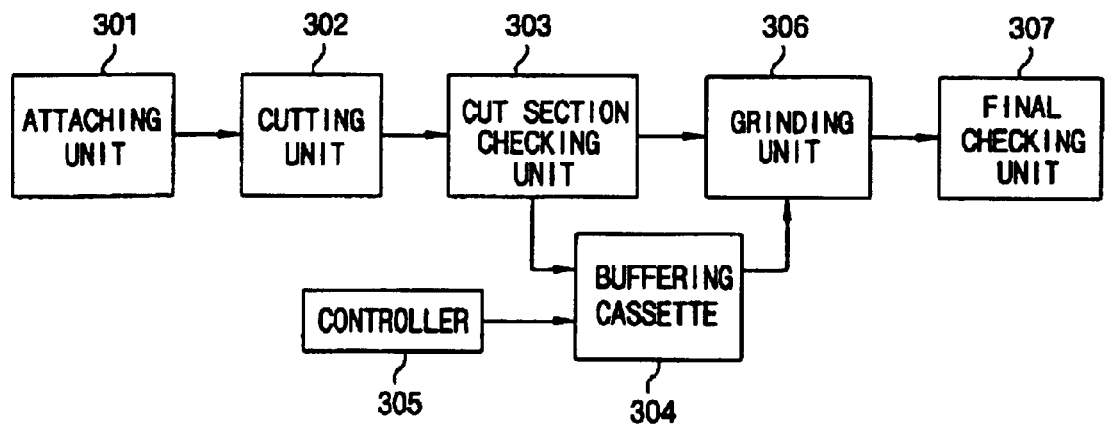
FIG. 8 is a block diagram of a fabricating apparatus of a liquid crystal display panel in accordance with an embodiment of the present invention.

FIG. 8 is a block diagram of an apparatus for fabricating of a liquid crystal display panel in accordance with an embodiment of the present invention.

As shown in FIG. 8, an apparatus for fabricating a liquid crystal display panel includes an attaching unit 301 for attaching a first mother substrate with thin film transistor array substrates formed thereon and a second mother substrate with color filter substrates formed thereon; a cutting unit 302 for cutting the first and second mother substrates into unit liquid crystal display panels; a cut section checking unit 303 for checking the cut section of the cut unit liquid crystal display panel; a buffering cassette 304 for sorting out and holding a defective unit liquid crystal display panel (in case of a single mode in which the unit liquid crystal display panels are the same in size), and sorting out and holding sub-model unit liquid crystal display panels (in case of a multi-mode in which the unit liquid crystal display panels are different in size); a controller 305 for providing information on the single mode and the multi-mode to the buffering cassette 304; a grinding unit 306 for grinding a marginal portion of a perfect non-defective unit liquid crystal display panel in case of the single mode and grinding a marginal portion of the unit liquid crystal display panel of a main model in case of the multi-mode; and a final checking unit 307 for checking the grinding unit liquid crystal display panels.

Processes performed in each block of the fabricating apparatus of a liquid crystal display panel will now be described in detail.

First, orientations are performed on the first mother substrate with thin film transistor array substrates formed thereon and on the second mother substrate with color filter substrates formed thereon. In performing the orientations, the first mother substrate and the second mother substrate are loaded into a first process line and a second process line, respectively, and subjected to cleaning, orientation film printing, curing, checking and rubbing. After rubbing is completed, the first and second mother substrates are unloaded from the first process line and the second process line.

The orientation-completed first mother substrate and second mother substrate are attached by the attaching unit 301. The attaching process differs depending on formation methods of a liquid crystal layer.

Liquid crystal layer formation methods are roughly divided into a vacuum injection method and a dropping method. In the vacuum injection method, the first mother substrate with the thin film transistor array substrates formed thereon and the second mother substrate with the color filer substrates formed thereon are attached with a uniform cell-gap therebetween and cut into unit liquid crystal display panels. Then, a liquid crystal is filled in a container and a liquid crystal injection hole provided at one short side of the unit liquid crystal display panel is put in or comes in contact with the liquid crystal. Pressure and vacuum are controlled so the liquid crystal from the container fills the empty space of the cell-gap between the substrates.

Thus, in case of adopting the vacuum injection method, a sealant and a spacer are formed on the first and second mother substrates and attached before liquid crystal is provided.

Meanwhile, in the dropping method, a normal amount of liquid crystal is dropped on one of first and second mother substrates and a sealant is formed on the other substrate in appropriate locations for the unit liquid crystal display panels to be cut from the mother substrates. Then, the first mother substrate and the second mother substrate are pressurized to be attached in a chamber, so that the dropped liquid crystal can be uniformly distributed over the unit liquid crystal display panels of the mother substrates. In this respect, the liquid crystal dropping and the sealant forming can be simultaneously performed at either one of the first and second mother substrates.

The first and second mother substrates as attached are cut into unit liquid crystal display panels by the cutting unit 302. In this case, referring to the cutting of the first and second mother substrates, a predetermined cutting line is formed on the first and second mother substrates by using a wheel with a high hardness compared to the glass and propagating a crack along the predetermined cutting line. The cut section checking unit 303 checks whether a burr remains on the cut section of the unit liquid crystal display panel.

In case of the single mode, the unit liquid crystal display panels cut by the cutting unit 302 have the same sizes each other. In case of the multi-mode, the cut unit liquid crystal display panels have different sizes from each other.

Figure 6:
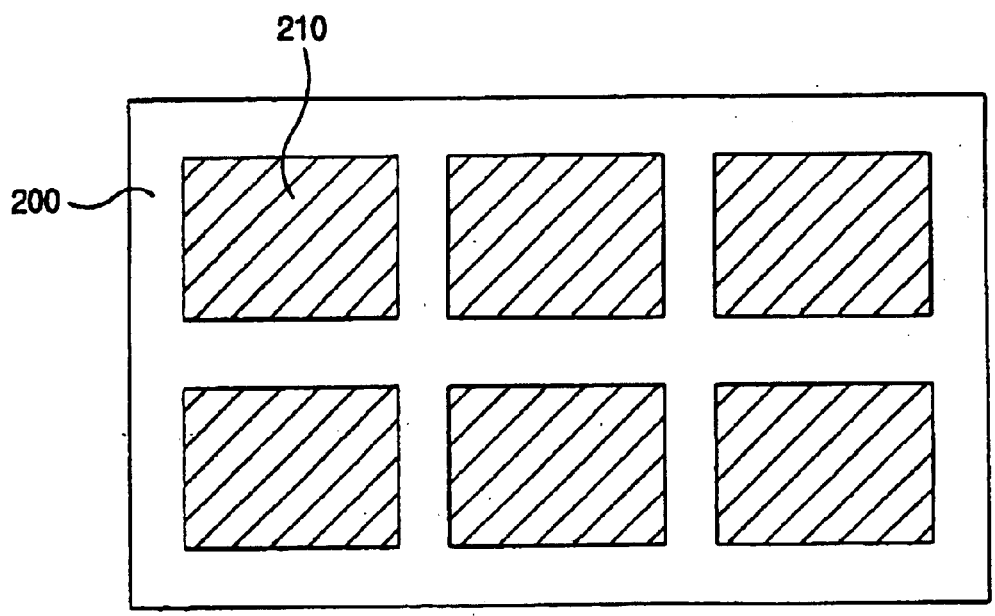
FIG. 6 is an exemplary view showing a plurality of liquid crystal display panel formed on a large mother substrate.

As described above with reference to FIG. 6, in case of the single mode, the six liquid crystal display panels 210 are formed at regular intervals in consideration of the size of the mother substrate 200 and the liquid crystal display panel 210.

Meanwhile, as also described above with reference to FIG. 7, in case of fabricating the relatively large sized liquid crystal display panels 220 in a state that the size of the mother substrate 200 is limited, only three liquid crystal display panels 220 can be formed on the mother substrate 200, and in this respect, since the portion of the mother substrate 200 where the liquid crystal display panel 220 is not formed must be discarded, the mother substrate 200 is not used efficiently.

However, in case of the single-mode, since the cut unit liquid crystal display panels have the same size as each other, a follow-up process can be continuously performed.

Figure 9:
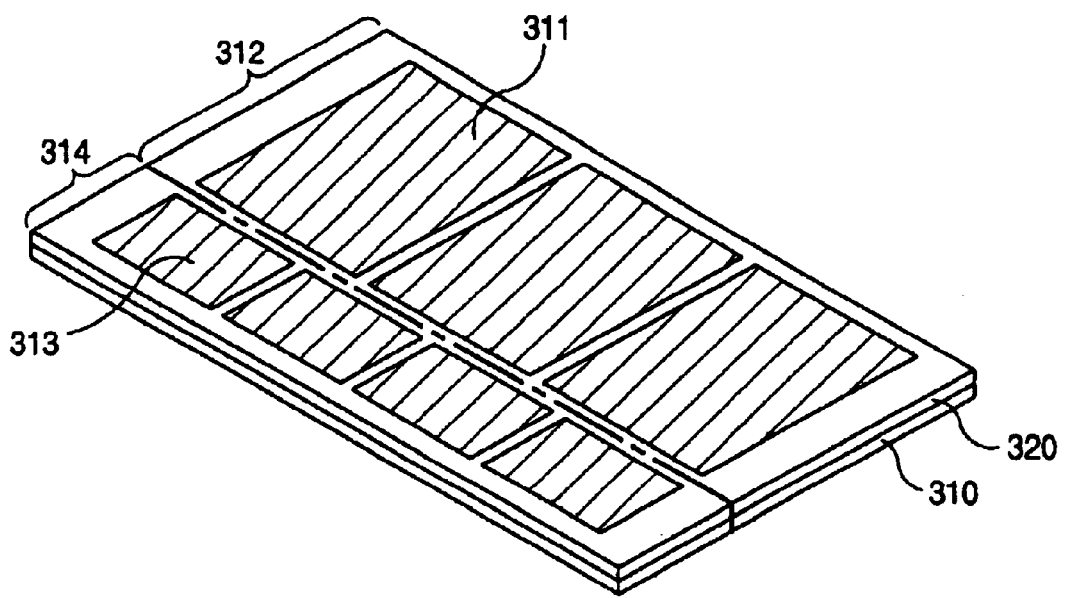
FIG. 9 is an exemplary view showing a mother substrate on which liquid crystal display panels with difference sizes are formed.

In the case of the multi-mode, with reference to FIG. 9, there are defined a first region 312 where three liquid crystal display panels 311 with a first size are formed at regular intervals on the first and second mother substrates 310 and 320 as attached, and a second region 314 where four liquid crystal display panels 313 with a second size are formed at regular intervals.

Figure 7:
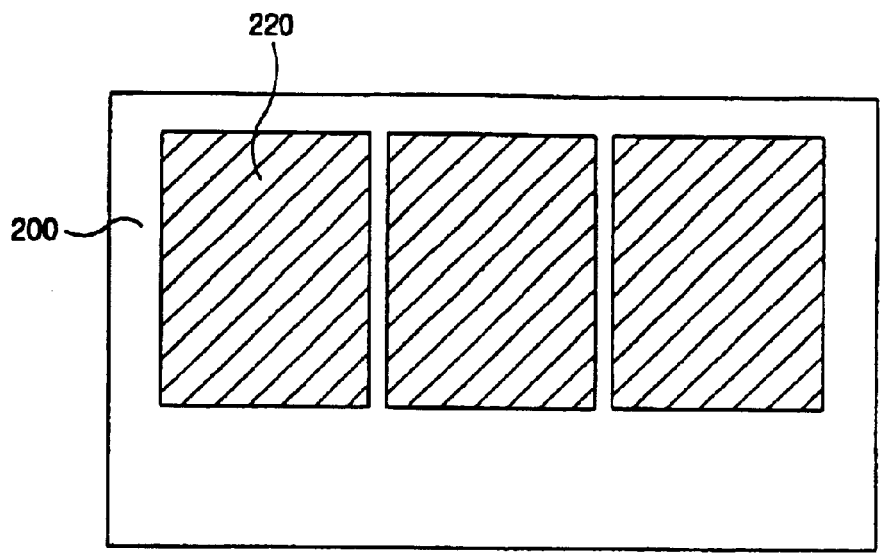
FIG. 7 is an exemplary view showing relatively large liquid crystal display panels formed on the mother substrate of FIG. 6.

Thus, since the four liquid crystal display panels 313 with the second size can be fabricated at the portion of the mother substrates, that otherwise would be discarded in the case as shown in FIG. 7, the efficiency of the use of the mother substrates can be maximized.

However, in such a case, since the individually cut three unit liquid crystal display panels 311 and four unit liquid crystal display panels 313 have the difference sizes, a follow-up process may not be simultaneously performed.

Thus, in the present invention, in the case of the multi-mode, the controller 305 provides the corresponding information to the buffering cassette 304 and controls the buffering cassette 304 so that the four unit liquid crystal display panels 313 can be sorted out as sub-models and held in the buffering cassette 304.

As for the four unit liquid crystal display panels 313 held in the buffering cassette 304, the controller 305 controls the buffering cassette 304 to proceed with a follow-up process for them, after a follow-up process for the three unit liquid crystal display panels 311 as the main models is completed.

Figure 1:
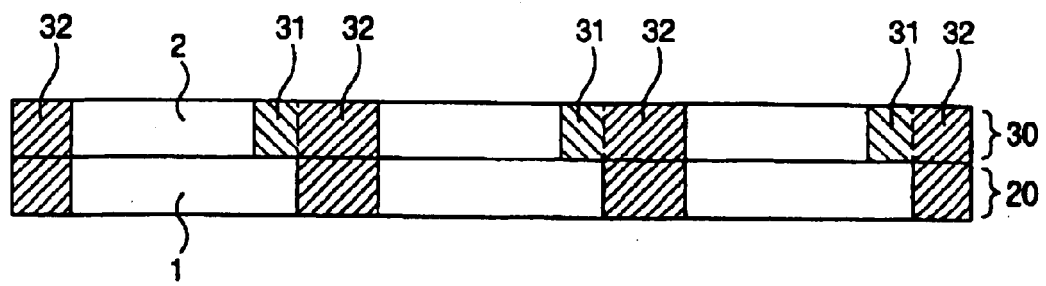
FIG. 1 is an exemplary view illustrating a sectional of a plurality of unit liquid crystal display panels formed by attaching a first mother substrate with thin film transistor array substrates formed thereon and a second mother substrates with color filter substrates formed thereon.
Figure 2:
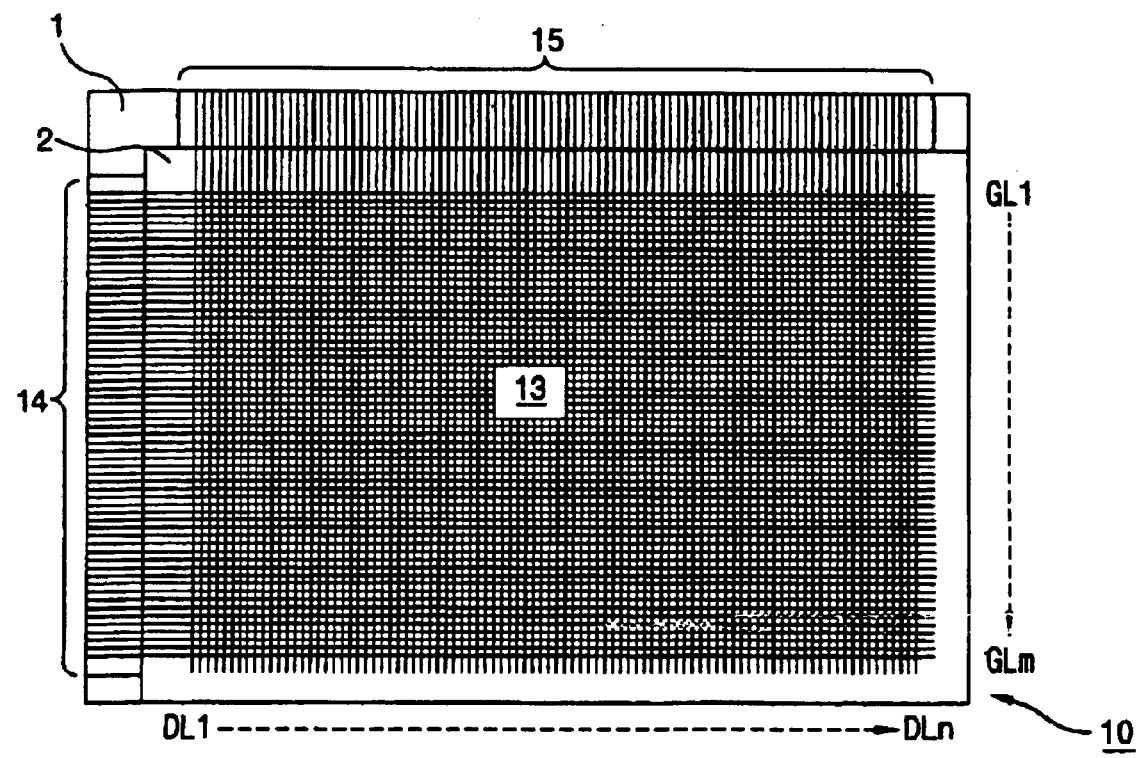
FIG. 2 is an exemplary view showing a schematic plan structure of an individually cut unit liquid crystal display panel.
Figure 3:
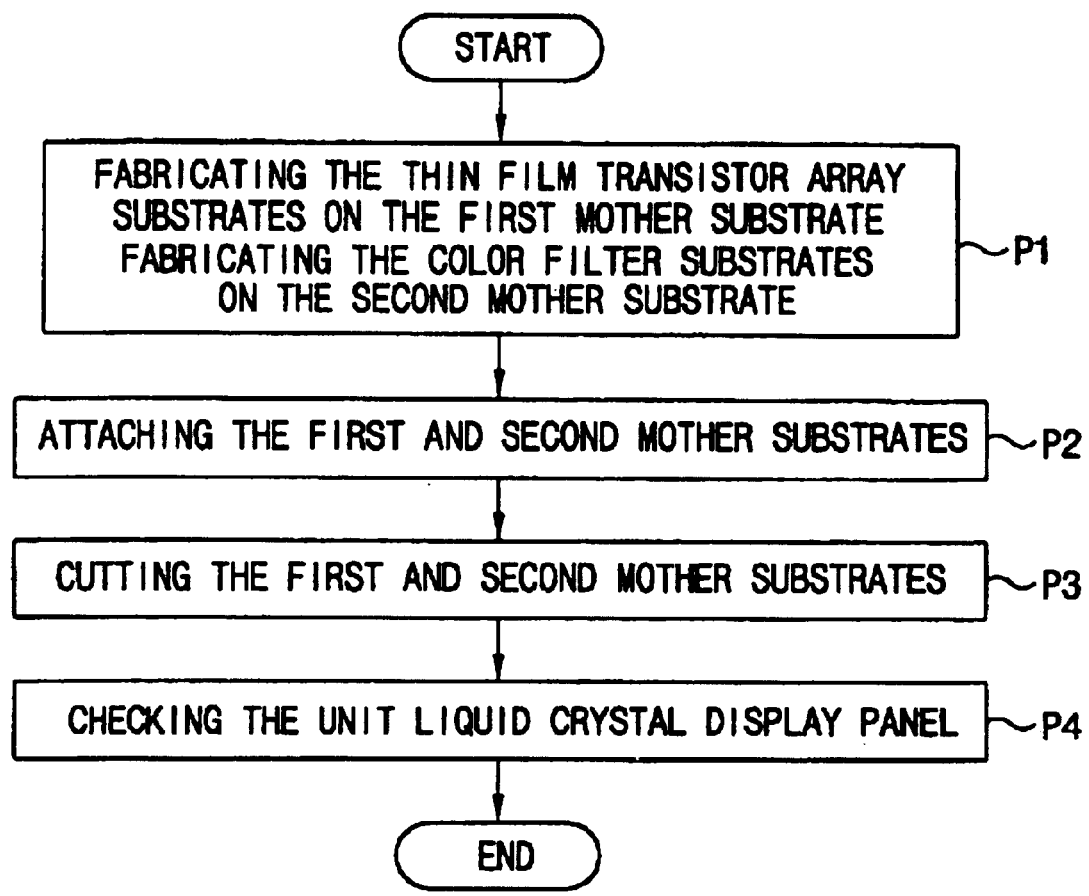
FIG. 3 is a brief flow chart of a process of fabricating the unit liquid crystal display panel.
Figure 4:
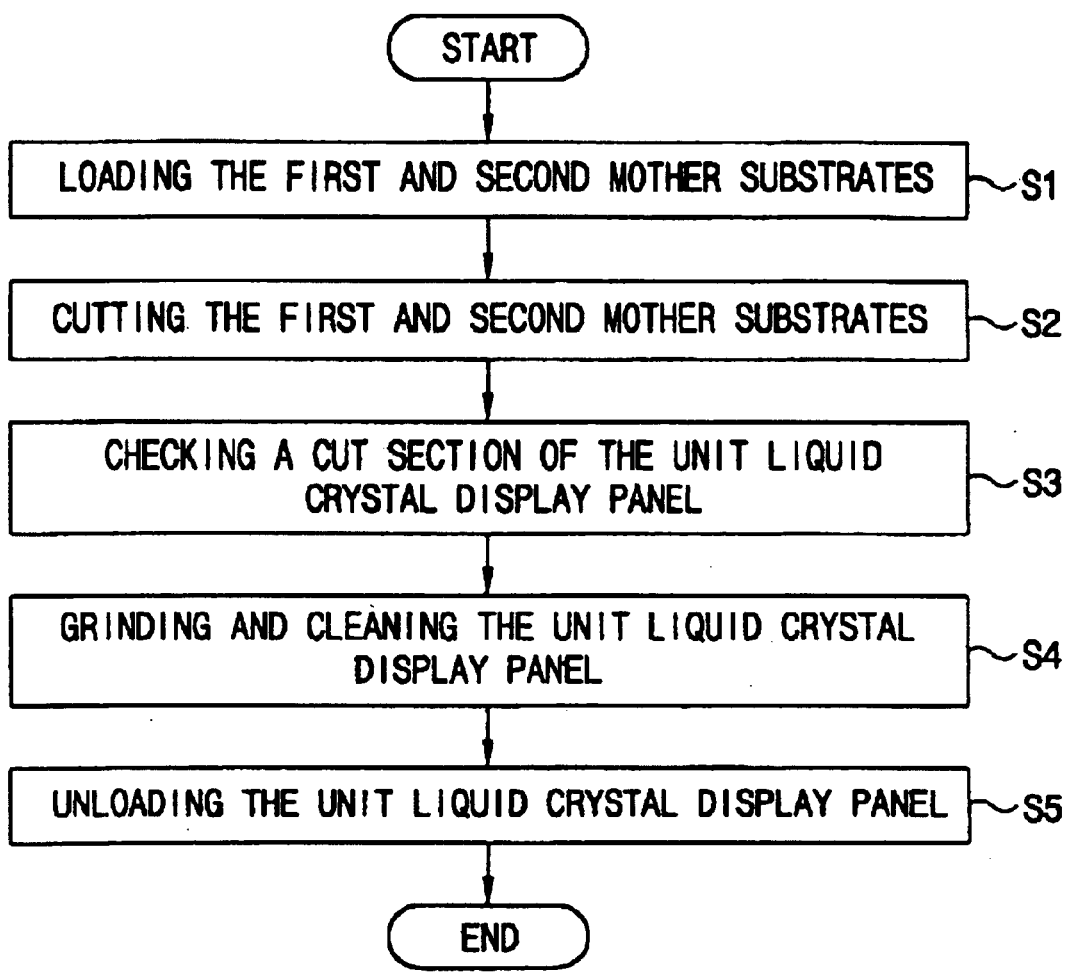
FIG. 4 is a detailed flow chart of a process of cutting the first mother substrate and the second mother substrate after they have been attached and extracting a unit liquid crystal display panel of FIG. 3.
Figure 5:
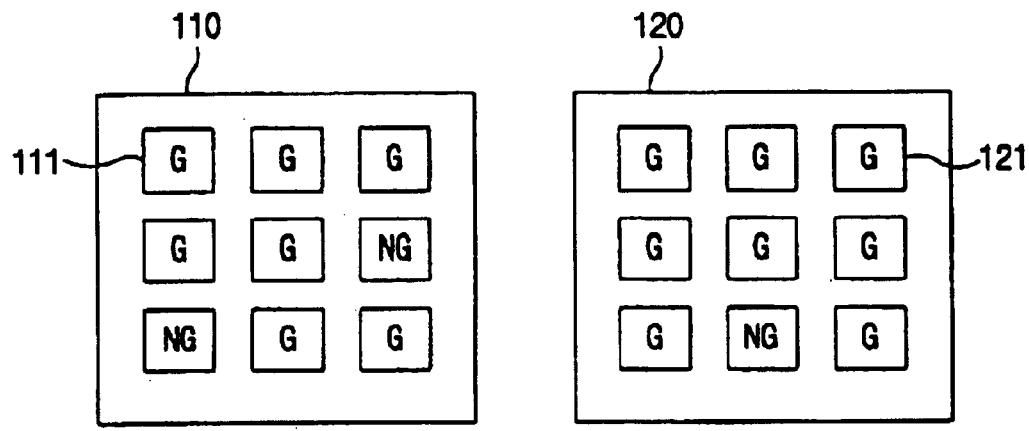
FIG. 5 is an exemplary view showing defective thin film transistor array substrates and defective color filter substrates formed on the first and second mother substrates.

As mentioned above with reference to FIG. 5, the unit liquid crystal display panels individually cut by the cutting unit 302 may be randomly defective due to an unexpected error during each fabricating process of the thin film transistor array substrates 111 and the color filter substrates 121 formed on the first and second mother substrates 110 and 120.

Then, it may happen that the 'NG'-indicated thin film transistor array substrate 111 and 'G'-indicated color filter substrate 121 are attached to cut into a unit liquid crystal display panel or 'G'-indicated thin film transistor array substrate 111 and the 'NG'-indicated color filter substrate 121 are attached to cut into a unit liquid crystal display panel.

In such a case, the unit liquid crystal display panels cannot be used in a product, and are unavoidably discarded.

In the related art, the unit liquid crystal display panels to be discarded undergo the grinding, cleaning and final checking likewise the unit liquid crystal display panels to be made products.

Comparatively, however, in the present invention, in case of the single mode, the controller 305 provides the corresponding information to the buffering cassette 304 and controls the buffering cassette 304 to sort out the unit liquid crystal display panels to be discarded, hold them therein and then discard them.

Thus, no follow-up process is performed on the unit liquid crystal display panels to be discarded.

Meanwhile, in case of the single mode, the marginal portions of the non-defective unit liquid crystal display panels are ground by the grinding unit 306 and checked by the final checking unit 307.

Meanwhile, in case of the multi-mode, the marginal portions of the main-model unit liquid crystal display panels are ground by the grinding unit 306, checked by the final checking unit 307, and then the marginal portions of the sub-model unit liquid crystal display panels are ground by the grinding unit 306 and checked by the final checking unit 307.

Figure 10:
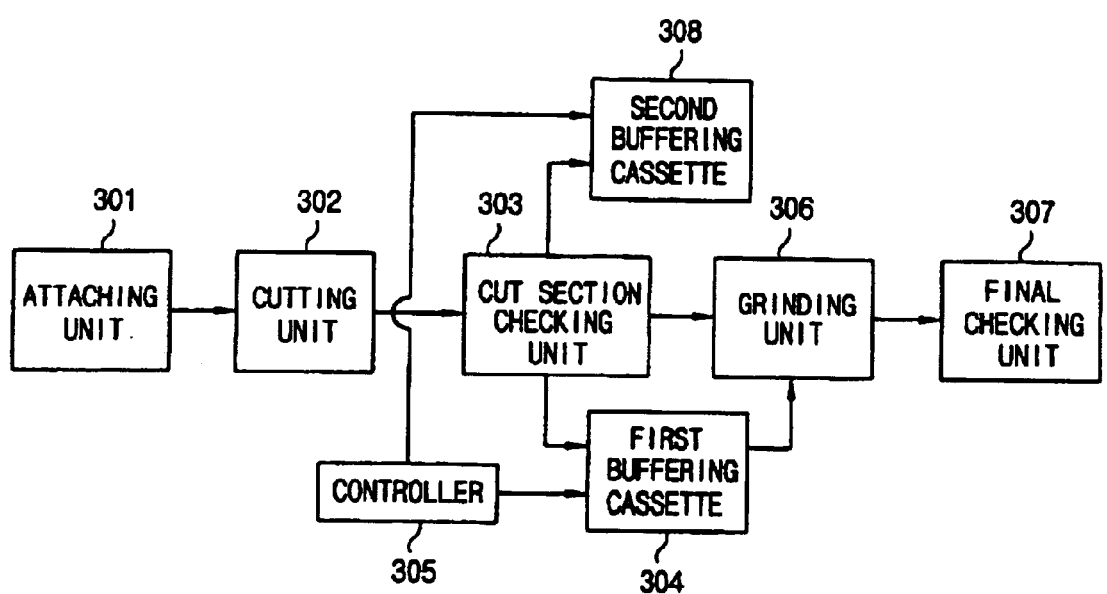
FIG. 10 is a block diagram of a fabricating apparatus of a liquid crystal display panel in accordance with another embodiment of the present invention.

FIG. 10 is a block diagram of an apparatus for fabricating of a liquid crystal display panel in accordance with another embodiment of the present invention.

As shown in FIG. 10, an apparatus for fabricating a liquid crystal display panel includes an attaching unit 301 for attaching a first mother substrate with thin film transistor array substrates formed thereon and a second mother substrate with color filter substrates formed thereon; a cutting unit 302 for cutting the first and second mother substrates into unit liquid crystal display panels; a cut section checking unit 303 for checking the cut section of the cut unit liquid crystal display panel; a first buffering cassette for sorting out and holding sub-model unit liquid crystal display panels (in case of a multi-mode in which the unit liquid crystal display panels are different in size); a second buffering cassette 308 for sorting out and holding a defective unit liquid crystal display panel (in case of a single mode in which the unit liquid crystal display panels are the same in size); a controller 305 for providing information on the single mode and the multi-mode to the first buffering cassette 304; a grinding unit 306 for grinding a marginal portion of a perfect non-defective unit liquid crystal display panel in case of the single mode and grinding a marginal portion of the unit liquid crystal display panel of a main model in case of the multi-mode; and a final checking unit 307 for checking the grinding unit liquid crystal display panels.

FIG. 11 is a flow chart of a method for fabricating a liquid crystal display panel in accordance with an embodiment of the present invention.

As shown in FIG. 11, a fabricating method of a liquid crystal display panel includes determining whether a cut unit liquid crystal display panel is in a single mode or a multi-mode (S101), determining whether a cut unit liquid crystal display panel is non-defective or defective in case of the single mode (S102), sorting out and discarding defective unit liquid crystal display panels (S103), grinding a marginal portion of the non-defective unit liquid crystal display panel (S104), finally checking the unit liquid crystal display panel with the marginal portion ground (S105), determining whether the cut unit liquid crystal display panel is a main model or a sub-model in case of the multi-mode (S106), grinding a marginal portion of the unit liquid crystal display panel in case of the main model (S107), finally checking the unit liquid crystal display panel of the main model with the marginal portion ground (S108), holding the sub-model unit liquid crystal display panels in buffering cassette (S109), determining whether the process of the main model has been completed (S110), grinding a marginal portion of the sub-model unit liquid crystal display panel if the process of the main model has been completed (S111), and finally checking the sub-model unit liquid crystal display panel with the marginal portion ground (S112).

The apparatus and method for fabricating a liquid crystal display panel of the present invention have the following advantages.

That is, in case of the single mode that liquid crystal display panels are fabricated with the same size on a large glass substrate, defective unit liquid crystal display panels are held and discarded so as not to proceed with a follow-up process. Thus, a material waste is reduced, and yield is improved.

Meanwhile, in case of the multi-mode that liquid crystal display panels are fabricated with difference sizes on a large glass substrate, sub-models are held, and then after completing the process for the main models, a follow-up process is performed on the sub-models. Thus, efficient use of the glass substrate can be maximized to improve productivity, and a cost of the product can be reduced.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. An apparatus for fabricating of a liquid crystal display panel comprising:

an attaching unit attaching a first mother substrate to a second mother substrate;

a cutting unit cutting the first and second mother substrates into unit liquid crystal display panels;

a checking unit checking for defects in the unit liquid crystal display panels;

a buffering cassette holding a defective unit liquid crystal display panel and discarding the defective liquid crystal display panel, if it is of no single mode and discarding the defective liquid crystal display panel if it is of a single mode;

a grinding unit grinding a marginal portion of the unit liquid crystal display panels; and a final checking unit checking the unit liquid crystal display panels.

2. The apparatus of claim 1, wherein the first mother substrate includes thin film transistor array substrates.

3. The apparatus of claim 1, wherein the second mother substrate includes color filter substrates.

4. The apparatus of claim 1, wherein a liquid crystal is applied on one of the first and second mother substrates, and a sealant is formed on the other mother substrate.

5. The apparatus of claim 1, wherein a liquid crystal and a sealant are dropped on one of the first and second mother substrates.

6. The apparatus of claim 1, wherein the unit liquid crystal display panels include a single mode having all substantially the same sizes.

7. The apparatus of claim 1, wherein the unit liquid crystal display panels include multi-modes having at least two different sizes.

8. The apparatus of claim 7, further comprising another buffering cassette holding unit liquid crystal display panels of one of the at least two different sizes.

9. The apparatus of claim 1, further comprising a controller controlling the buffering cassette according to whether one of the first and second mother substrates is one of single mode and multi-mode having a main model and a sub-model.

10. The apparatus of claim 9, wherein the controller controls the buffering cassette to discard a defective unit liquid crystal display panel of the single mode.

11. The apparatus of claim 9, wherein the controller controls the buffering cassette to transmit the unit liquid crystal display panel of the sub-model to the grinding unit.

12. The apparatus of claim 1, wherein the grinding unit includes grinding of non-defective unit liquid crystal display panels.

13. The apparatus of claim 1, wherein the grinding unit includes grinding one of a main model and a sub-model if one of the first and second mother substrates is in a multi-mode.

* * * * *